US009313170B1

(12) United States Patent
Shoemaker et al.

(10) Patent No.: US 9,313,170 B1
(45) Date of Patent: Apr. 12, 2016

(54) IDENTITY PROTECTION AND MANAGEMENT FOR ELECTRONIC COMMUNICATION

(71) Applicant: GOOGLE INC., Mountain View, CA (US)

(72) Inventors: Garth Shoemaker, Sunnyvale, CA (US); Michael Eugene Aiello, North Palm Beach, FL (US)

(73) Assignee: GOOGLE INC., Mountain View, CA (US)

( * ) Notice: Subject to any disclaimer, the term of this patent is extended or adjusted under 35 U.S.C. 154(b) by 108 days.

(21) Appl. No.: 14/451,253

(22) Filed: Aug. 4, 2014

(51) Int. Cl.
*H04L 29/06* (2006.01)
*H04L 29/12* (2006.01)
*H04L 9/14* (2006.01)

(52) U.S. Cl.
CPC .............. *H04L 61/2539* (2013.01); *H04L 9/14* (2013.01); *H04L 29/06653* (2013.01); *H04L 61/2503* (2013.01); *H04L 63/0407* (2013.01); *H04L 63/0421* (2013.01); *H04L 63/1433* (2013.01); *H04L 61/6013* (2013.01); *H04L 2209/24* (2013.01)

(58) Field of Classification Search
CPC ............ H04L 61/2539; H04L 61/2503; H04L 61/6013; H04L 63/1433; H04L 9/14; H04L 2209/24; H04L 29/06653; H04L 63/0407; H04L 63/0421
See application file for complete search history.

(56) References Cited

U.S. PATENT DOCUMENTS

| 6,643,687 | B1 | 11/2003 | Dickie et al. | |
|---|---|---|---|---|
| 7,461,397 | B2* | 12/2008 | Karamchedu | G06Q 10/107 709/206 |
| 7,908,328 | B1* | 3/2011 | Hulten | H04L 12/585 709/204 |
| 8,250,225 | B1* | 8/2012 | Eubanks | 709/206 |
| 8,364,711 | B2 | 1/2013 | Wilkins et al. | |
| 8,375,434 | B2 | 2/2013 | Cottrell et al. | |
| 2005/0246420 | A1* | 11/2005 | Little, II | G06Q 10/107 709/204 |
| 2006/0106914 | A1* | 5/2006 | Plow | H04L 51/12 709/206 |
| 2010/0235452 | A1* | 9/2010 | Fukasawa | H04L 51/30 709/206 |
| 2011/0295988 | A1* | 12/2011 | Le Jouan | G06F 21/31 709/223 |

OTHER PUBLICATIONS

Duffy, J., Get Organized: Tricks for a Better Gmail Inbox, Mar. 24, 2014, PCMag.com, 6 pgs [online] [retrieved on Jun. 3, 2014] URL: http://www.pcmag.com/article2/0,2817,2455299,00.asp.
Stein, R., 2 Hidden Ways to get More from your Gmail Address, Official Gmail Blog, Mar. 5, 2008, 2 pgs, [online] [retrieved on Jun. 3, 2014] URL: http://gmailblog.blogspot.com/2008/03/2-hidden-ways-to-get-more-from-your.html.

(Continued)

*Primary Examiner* — Jung Kim
*Assistant Examiner* — Ngoc D Nguyen
(74) *Attorney, Agent, or Firm* — Procopio, Cory, Hargreaves & Savitch LLP

(57) ABSTRACT

Identity protection and management for electronic communication is described, including receiving a request to provide data from a first address to a second address, the request including an attribute associated with the second address, determining a risk value of the second address based on the attribute associated with the second address and a risk score, based on the risk value of the second address generating a third address that is associated with the first address, and providing the data and the third address to the second address without providing the first address to the second address.

20 Claims, 9 Drawing Sheets

(56) References Cited

OTHER PUBLICATIONS

Trapani, G., Instant Disposable Gmail Addresses, lifehacker.com, Dec. 21, 2005, 5 pgs [online] [retrieved on Jun. 3, 2014] URL: http://lifehacker.com/144397/instant-disposable-gmail-addresses.

Using an address alias, Google help, 2 pgs. [online] [retrieved on Jun. 3, 2014] URL: https://support.google.com/mail/answer/12096?hl=en.

The Mailanator FAQ, mailinator.com, 4 pages [online] [retrieved on Jun. 3, 2014] URL: http://mailinator.com/faq.html.

* cited by examiner

500

Taco Town Online Order Form
Your order:
3 tacos
2 burritos

501 — Name: Jayne C.
503 — Address: 178 Bunk St.
505 — Phone #: 555-2459
507 — Email: jayne@ XYZ.COM XYZ will use the following proxy address for this form
jayne6548@ XYZ.COM Ok | No, use jayne@XYZ.COM 509  511  513

FIG. 5

| Email Address | Original Address | Status | Target Entity | Target Email |
|---|---|---|---|---|
| foo@test.com | foo@test.com | Original | XCOM | test@xcom.com |
| foo+XCOM@test.com | foo@test.com | Active | XCOM | test@xcom.com |
| foo54376@test.com | foo@test.com | Blacklisted | XCOM | test@xcom.com |
| dfghsfegd@test.com | foo@test.com | Active | XCOM | test@xcom.com |
| bar@test.com | bar@test.com | Original | XBANK | *@xbank.com |
| bar+XBANK@test.com | bar@test.com | Blacklisted | XBANK | *@xbank.com |
| bar345t443@test.com | bar@test.com | Active | XBANK | *@xbank.com |
| opksdmne@test.com | bar@test.com | Active | XBANK | *@xbank.com |

FIG. 6

IDENTITY PROTECTION AND MANAGEMENT FOR ELECTRONIC COMMUNICATION

BACKGROUND

1. Field

The subject matter discussed herein relates generally to identity protection and management of identity information for electronic communication, and more particularly, to automatically detecting, reporting and stopping abuses of electronic communication by use of a proxy address based on a user-determined risk value.

2. Related Background

A user of an online account may communicate electronically with another party (e.g., retailer, financial institution, or website). When the user communicates via electronic email or "email", the other party may acquire the contact information of the user of the online account, such as the email address. The other party may subsequently disclose the contact information of the user to yet another party, often without the consent or even knowledge of the user of the online account.

As a result of the above-described disclosure of user information, the user may receive unsolicited communication (e.g., spam). When the information is disclosed to other parties, the result may be that the user receives a large volume of spam. Under such circumstances, the user may not be able to stop the spam communication, or identify the party that initially disclosed the user's contact information.

For example, Alice uses her email address, alice@xyz.com, to send an email inquiry to ABC Corporation (e.g., customer@abc.com). Without Alice's knowledge or consent, ABC Corporation discloses or sells the email address of Alice to 123 Corporation, which in turn provides the email address to various other parties. Subsequently, Alice receives spam from various email addresses. However, none of the spam email addresses include the information of ABC Corporation or 123 Corporation. As a result, Alice cannot determine that ABC Corporation initially gave away her information. Moreover, it becomes difficult for Alice to manage her incoming email traffic, and separate the spam from the non-spam (e.g., legitimate) email.

SUMMARY

Aspects of the example implementations relate to protection of the identity of a user for electronic communication (e.g., email) between a source and a destination. At the source, a user-generated risk attribute associated with the destination may be provided to a server. At the server, a risk value is calculated based on the risk attribute from the user device and a server-generated risk score based on, for example, aggregated information about the destination. Depending on the risk value, the server may create a proxy address to communicate with the destination, such that the true email address or other account identifier associated with the source is obfuscated from the destination. A reply from the destination is managed by the server to de-obfuscate, filter, report and aggregate information related to destination, and provide the information to the source.

The subject matter includes methods for identity protection and management for electronic communication, including receiving, at a server, a request to provide data from a first address to a second address, the request including an attribute associated with the second address; determining a risk value of the second address, based on the attribute associated with the second address; based on the risk value of the second address, generating a third address that is associated with the first address; and providing, by the server, the data and the third address to the second address, without providing the first address to the second address.

The subject matter further includes a non-transitory computer readable medium having stored therein computer executable instructions for receiving a request to provide data from a first address to a second address, the request including an attribute associated with the second address; determining a risk value of the second address, based on the attribute associated with the second address; based on the risk value of the second address, generating a third address that is associated with the first address; and providing the data and the third address to the second address, without providing the first address to the second address.

Additionally, the subject matter includes at least one computing device comprising storage and a processor configured to perform receiving a request to provide data from a first address to a second address, the request including an attribute associated with the second address; determining a risk value of the second address, based on the attribute associated with the second address; based on the risk value of the second address, generating a third address that is associated with the first address; and providing the data and the third address to the second address, without providing the first address to the second address.

The subject matter further includes at least one computing device comprising storage and a processor comprising means for receiving a request to provide data from a first address to a second address, the request including an attribute associated with the second address; means for determining a risk value of the second address, based on the attribute associated with the second address; based on the risk value of the second address, means for generating a third address that is associated with the first address; and means for providing the data and the third address to the second address, without providing the first address to the second address.

The methods are implemented using one or more computing devices and/or systems. The methods may be stored in computer-readable media.

BRIEF DESCRIPTION OF THE DRAWINGS

FIG. 5 shows a web form user interface of a device at source A for generation of an attribute according to an example implementation.

FIG. 6 shows a table configured to store information associated with a source and a destination, according to an example implementation.

DETAILED DESCRIPTION

Figure 1:
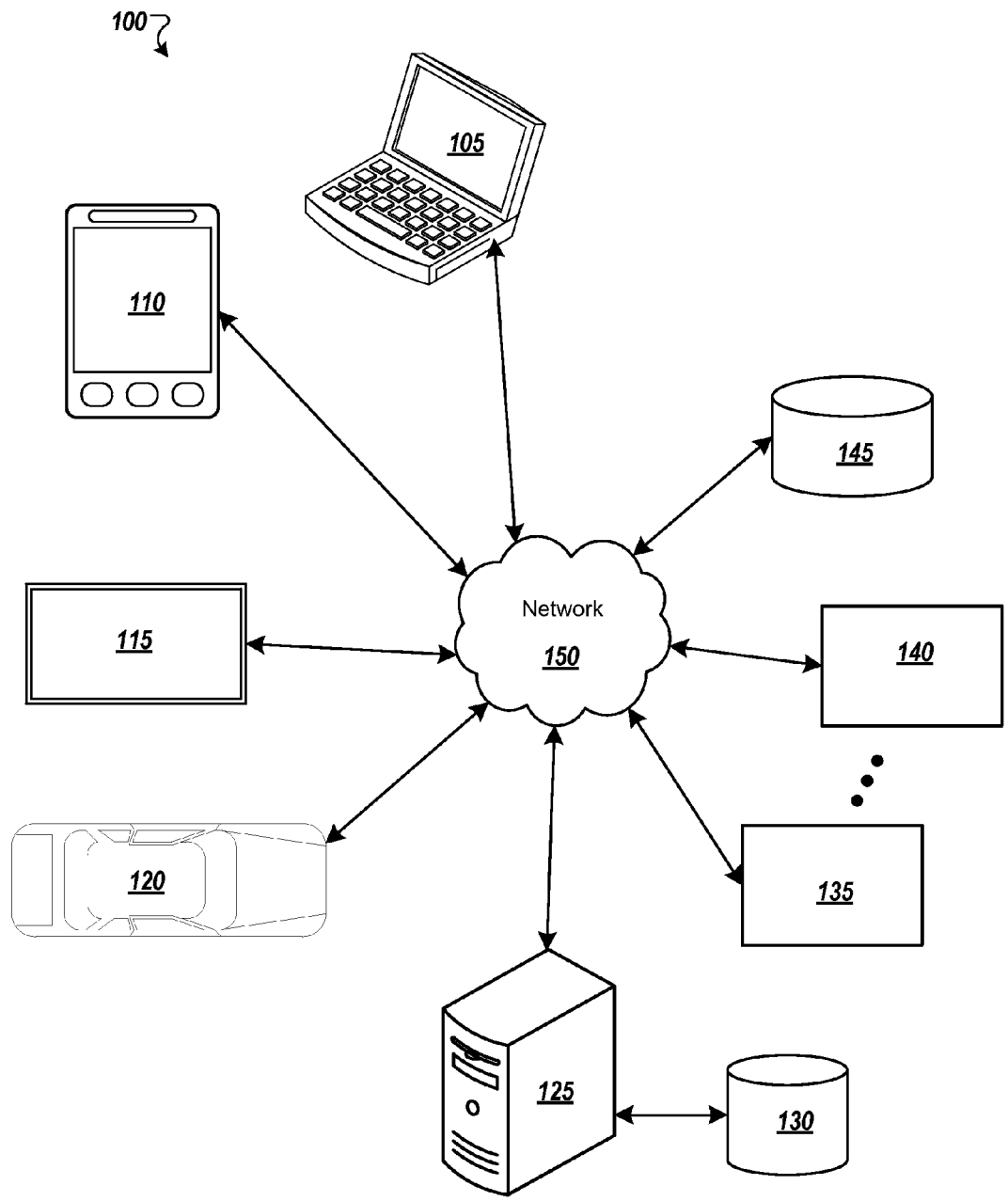
FIG. 1 shows an example environment suitable for some example implementations.

The subject matter described herein is taught by way of example implementations. Various details have been omitted for the sake of clarity and to avoid obscuring the subject matter. The examples shown below are directed to structures and functions for implementing identity protection and management for electronic communication.

Aspects of the example implementations are directed to a computer-implemented method of automatically detecting abuses of electronic communication, and providing the user with an opportunity to avoid disclosure of his or her own email identity during electronic communication.

For example, a server may receive a request from a user (e.g., source) to transmit a message to a destination without providing the user's actual address to the destination, by obfuscating the user's actual address, and instead providing the destination with a proxy address. The user provides such a request along with information about the destination. For example, the user may use account settings to identify the destination as an online retailer or merchant, as opposed to a family member or friend, and thus automate the generation of the proxy address prior to the generation of the electronic communication. The user may also request the use of the proxy address when generating the electronic communication (e.g., user may be prompted via email interface or web form).

The server, upon receiving the electronic communication request from the user, may generate a risk score based on information about the destination. The server may combine the risk score with the user request to determine a risk value. Based on the risk value, the server can generate the proxy address that is associated with the user's address, and provide the proxy address, but not the actual address of the user, to the destination.

According to the example implementations, the server generates the proxy address as a unique address for one or more external addresses with which a user communicates. For example, but not by way of limitation, the proxy address may be generated by transforming the first address by inserting one or more additional characters in a string of the first address, or appending to the first address. In this example implementation, the address of jayne@xyz.com may be transformed into jayne+abcd@xyz.com or jayne.abcd@xyz.com. In the example implementation, the proxy address may be mapped to a plurality of external addresses. For example, the proxy address may be mapped based on the domain of the external address, rather than just a single external email address.

According to another example implementation, undesired conversion of the proxy address to the original address by the recipient or other external parties can be further avoided, by generating the proxy address by deriving an obfuscated address as the proxy address, which cannot be converted to the first address without authorization. For example, a mapping table at the server may be used, including the use of a random string associated with the source address and the destination address in a table at the server.

A cryptography-based approach may also be used, in which a public key generates the proxy address, and a reply message received from the destination is then decrypted by use of a private key. According to the cryptography-based approach, the server that receives the request from the sender generates a proxy address using the public key and some combination of the original sender address, recipient address, and salt, (and possibly other meta-data) as inputs to the encryption algorithm. Further, an electronic communication (e.g., email) is provided to the recipient address, with the proxy address as the "From:" address. Next, an email is received from an external address. The "To:" field of the received email is decrypted using the private key. Accordingly, the resulting decrypted "To:" field can be parsed into the original sender address, recipient address, and any other encoded information. Subsequently, the actions discussed herein and with respect to FIG. 7, for example, are performed.

In an alternate example implementation, a one-way hash approach may be implemented. According to the one-way hash approach, the sender server generates a proxy address using a hashing algorithm such as SHA 256 with salt, and a set of inputs similar to the input in the above-disclosed cryptography approach. Next, a hashed<->non-hashed mapping is associated with a lookup table. It should be noted that unlike the foregoing example cryptographic approach, the hashing in the present example implementation cannot be subsequently reversed. Then, the electronic communication (e.g., email) is provided to a recipient address with the proxy address as the "From:" address. The email is received from the external party. Next, the "To:" address is looked up in the hash mapping lookup table, and the associated original address is found. Based on the foregoing lookup operation, the resulting "To:" field can be parsed into the original sender address, recipient address, and any other encoded information. Subsequently, the actions discussed herein and with respect to FIG. 7, for example, are performed.

Once the destination has received the proxy address, the proxy address may be disclosed or sold to another party without the permission of the source. In such a situation, when the proxy address is used to send spam, the server receives the electronic communication and may filter the sending of the message to the user, or provide the message to the user with further information about the originator of the spam.

The server may aggregate the information of destinations that are originators of spam activity, and develop further information or recommendations for such destinations, and provide reports to users. For example, the server may provide a report (e.g., regular or monthly report) to a user with a risk profile (e.g., spam activity) based on the destinations of electronic communication.

FIG. 1 shows an example environment suitable for some example implementations. Environment 100 includes devices 105-145, and each is communicatively connected to at least one other device via, for example, network 160 (e.g., by wired and/or wireless connections). Some devices may be communicatively connected to one or more storage devices 130 and 145.

An example of one or more devices 105-145 may be computing device 905 described below in FIG. 9. Devices 105-145 may include, but are not limited to, a computer 105 (e.g., a laptop computing device), a mobile device 110 (e.g., smartphone or tablet), a television 115, a device associated with a vehicle 120, a server computer 125, computing devices 135-140, storage devices 130 and 145.

In some implementations, devices 105-120 may be considered user devices (e.g., devices used by users to access services and/or issue requests, such as on a social network). These devices may be considered the source or first address, where the electronic communication originates. Devices 125-145 may be devices associated with service providers or destination (e.g., used by service providers to provide services and/or store data, such as webpages, text, text portions, images, image portions, audios, audio segments, videos, video segments, and/or information thereabout).

The destinations at devices 125-145 may provide the identity of the source or first address to another party that may cause spam to be sent to the user. Network 150 may be considered the location of the server that performs processes to automate detection, reporting and management, and executes one or more processes of the example implements disclosed herein.

For example, a user (e.g., Alice) may electronically communicate, via email interface or web form using user device 105 or 110, on a network 150, with XYZ Corporation at one or more devices 125-145. A recipient (e.g., XYZ Corporation) may receive the electronic communication from Alice sent via network 150.

Figure 2:
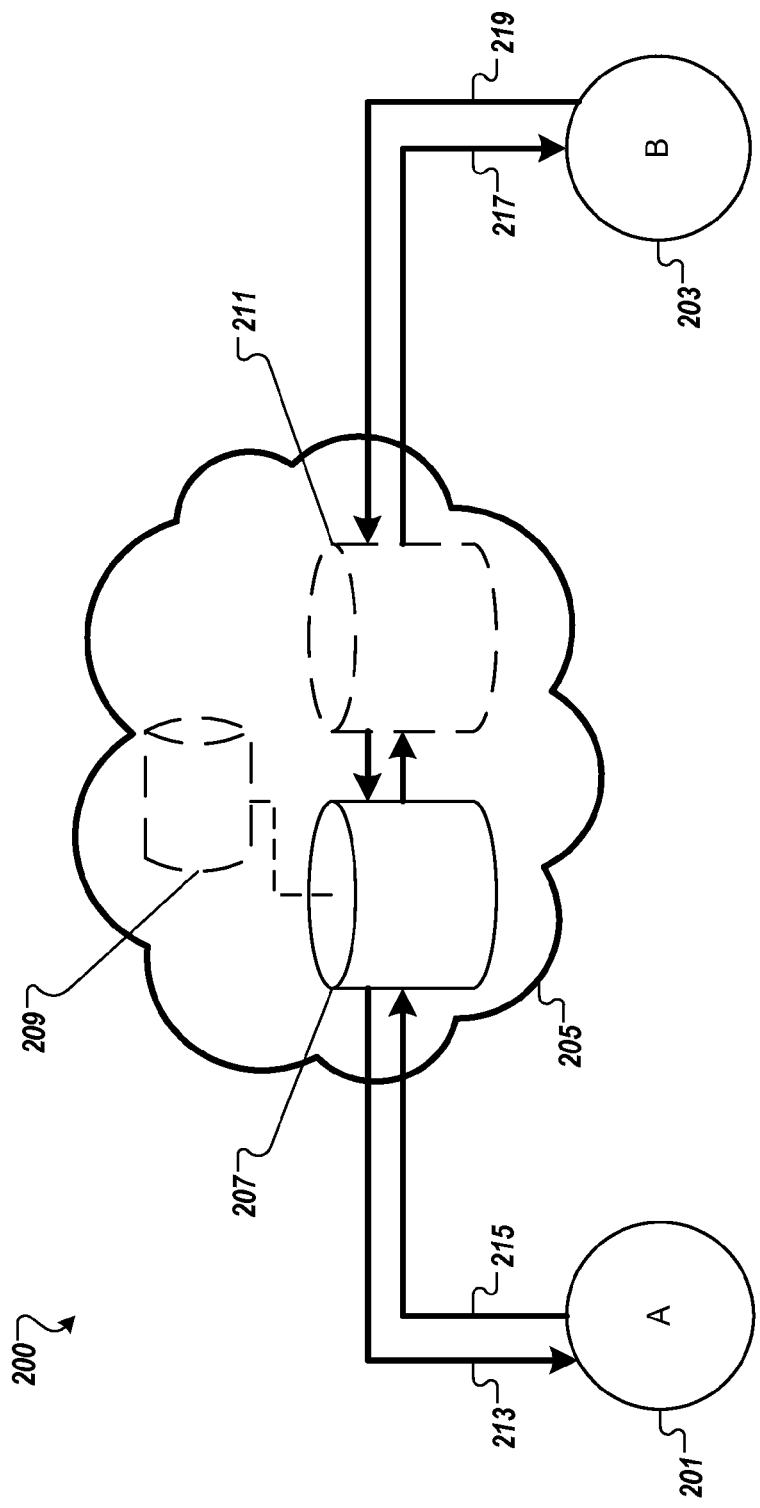
FIG. 2 shows communication between source A and destination B according to an example implementation.

FIG. 2 shows a specific communication environment 200 and the communication between source A and destination B according to an example implementation. For example, party A at device 201 may electronically communicate with party B at device 203, via network 205. The network 205 includes a server 207. The server 207 performs operations to evaluate risk, and based on information from the user and server-generated information, evaluates the risk, and automatically generates a proxy address. Optionally, the server 207 may access database 209 that includes a table containing information regarding the obfuscation of the source address to generate the proxy address. The server 207 may optionally communicate with one or more additional servers 211 that receive the electronic communication bearing the proxy address, but not the actual address of party A.

For example, but not by limitation, party A at device 201 may provide an electronic communication 215 to the server 207. The electronic communication 215 may include the destination address, message, attachments, and other information as would be understood by those skilled in the art. Additionally, the electronic communication may include an attribute, or instruction, generated by party A. The attribute may include an instruction from party A for the server to provide a proxy address to party B, without showing the actual address of party A. Optionally, party A may make this decision by taking into account information provided from server 207 in advance at electronic communication 213, for example, recommending or warning the user of possible risk associated with party B.

Based on the instructions from party A in electronic communication 215, the server 207 generates the proxy address as described herein, and provides an electronic communication 217 bearing the proxy address but not the actual address of party A to party B. Accordingly, when party B discloses the proxy address to other parties, which may generate spam, the other parties will be receiving the proxy address, and not the actual address of party A. For example, when party B, or another party, communicates with party A via communication 219, the server 207 receives the proxy address. Depending on the preference of the user (e.g., blacklist, whitelist, filter, warning, etc.), the server 207 processes the message addressed to the proxy address. Further, the server 207 may transmit electronic communication 213 to party A at device 201. Electronic communication 213 may include, but is not limited to, a flag or warning that the party B has sent a reply. The actual content of the reply may or may not be provided to party A, depending on the preference of party A.

In order for the user (e.g., party A) to generate electronic communication 215, an interface may be provided at the time of generating the electronic communication, or as a party of the account settings, so that the user may determine preferences in advance of generating the electronic communication.

Figure 3:
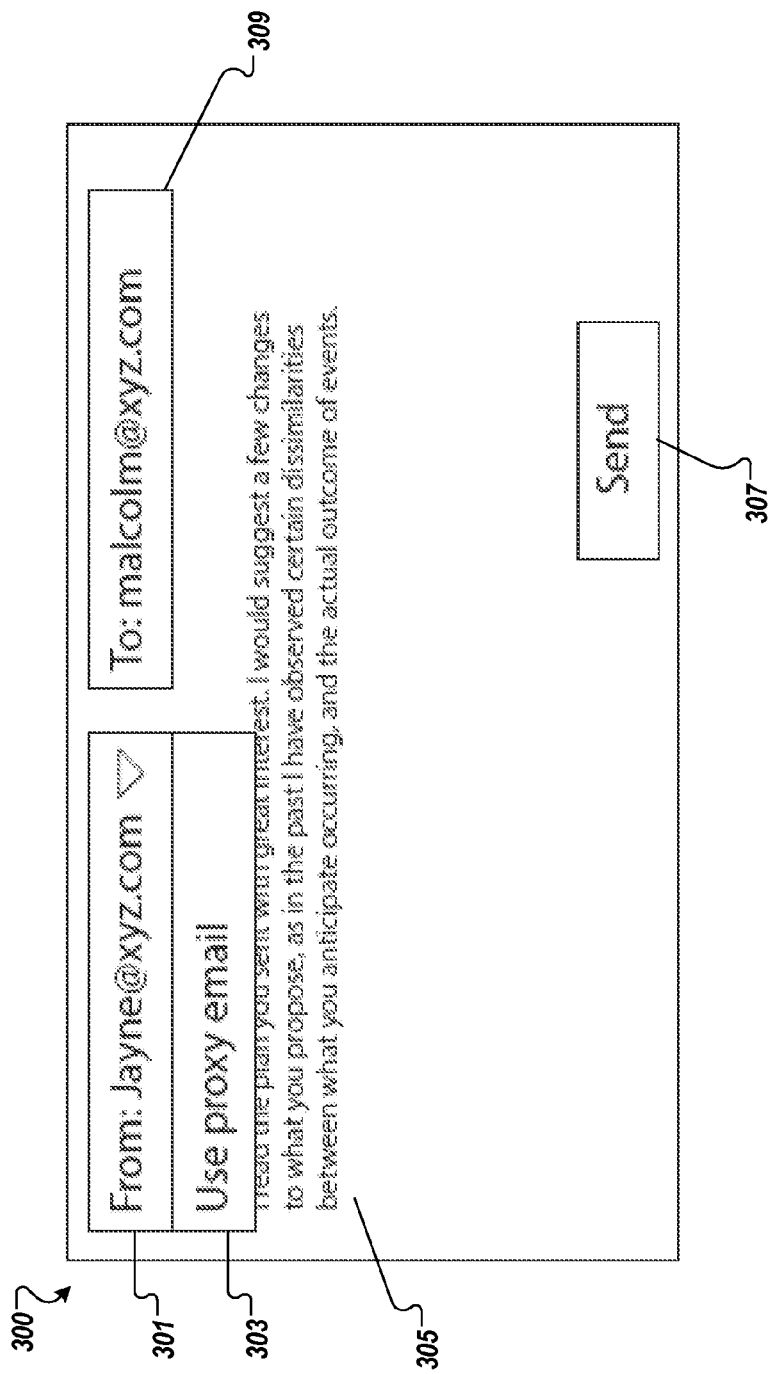
FIG. 3 shows a message delivery user interface of a device at source A for generation of an attribute according to an example implementation.
Figure 4:
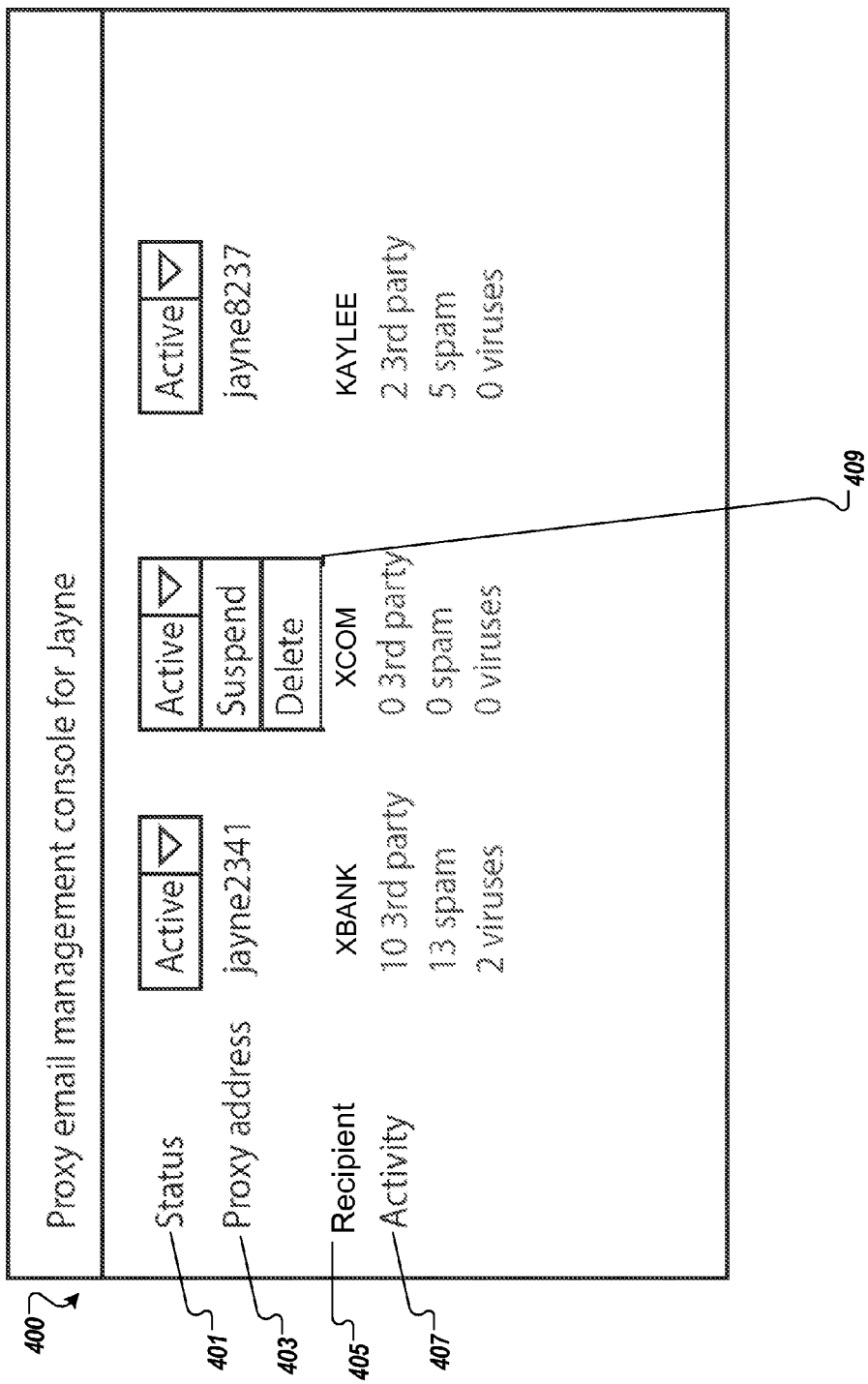
FIG. 4 shows an account profile user interface of a device at source A for generation of an attribute according to an example implementation.

FIGS. 3-5 illustrate various example user interfaces for a user to manage the electronic communication and proxy address features. However, the user interfaces do not limit the scope of the example implementations, and merely serve as examples of user interfaces. Other user interfaces may be substituted therefor, as would be understood in the art, without departing from the scope of the inventive concept.

FIG. 3 shows a message delivery user interface 300 of a device at source A for generation of an attribute according to an example implementation. For example, the device may include device 201 (e.g., user device) as shown in FIG. 2. In this example implementation, the user is creating an electronic communication via message (e.g., email) delivery user interface 300 that includes a sender address field 301. Other fields may also be provided in the user interface, including (but not limited to) destination address field 309, as shown in FIG. 3.

When the user address is populated (e.g., automatically) by the electronic communication application as jayne@XYZ.com, an option 303 is displayed that allows the user to select "Use proxy email". If the user selects option 303, then the electronic communication 215 from the device 201 to the server 207 will include an instruction from the user to generate the proxy address. Further, the electronic communication 215 will also include other content 305. The electronic communication 215 will be transmitted once the user selects the SEND object 307. Thus, the attributes and the user instruction are generated at the time of generating the electronic communication in the example implementation of FIG. 3.

FIG. 4 shows an account profile user interface 400 of a user device at source A for generation of an attribute according to an example implementation. For example, in the account settings or account profile, a user may view a status 401, a proxy address 403, a recipient 405, and an activity 407. The user may select to have the status 401 as "Active", "Suspend", or "Delete", as shown in reference numeral 409. Under the "Active" status, the proxy address created for a specific recipient remains in use for communication. Alternatively, the user may suspend use of the proxy (e.g., allow the recipient to see the actual address of the user), or delete the proxy (e.g., the recipient has somehow associated with the actual address with the proxy address, such that the proxy address no longer shields the user). In the latter situation, the server may generate another proxy address, based on instructions from the user. Proxy address 403 shows the proxy address that has been generated for communication with the recipient 405, and activity 407 may show the activity associated with the proxy address and the recipient. Activity 407 may also show not only the activity from the recipient, but also activity from other external parties that have sent electronic communication (e.g., email) to the address mapped to the recipient.

For example, in FIG. 4, for recipient XBANK, the user having the actual user address of "jayne" is actively using the proxy "jayne2341". This proxy address has been used to generate 10 third party messages, 13 spam messages, and 2 viruses. The user thus continues the "Active" status for this proxy address. In contrast, for recipient XCOM, the proxy address has generated no third emails, no spam messages, and no viruses. Accordingly, the user may determine to suspend or delete this proxy address, based on the lack of risky activity. For recipient KAYLEE, the proxy "jayne8237" is being used with an "Active" status, as there are 2 third party emails and 5 spam messages, although there are no viruses. Accordingly, the user may manage proxy addresses via account settings, such that the attribute is automatically generated when the electronic communication is created and automatically incorporated into electronic communication 215 as the attribute, without the user selecting the option 303 shown in FIG. 3.

FIG. 5 shows a web form interface 500 of a user device at source A for generation of an attribute according to an example implementation. For example, in the web form in a browser, either via auto-filling or manual user entry, name 501, address 503, phone number 505 and sender email 507 are provided. Additionally a message 509 is provided to the user, indicating that the service provider XYZ will generate a proxy address in use of the form, as jayne6548@XYZ.COM. The user may elect to accept the proxy address by selecting object (e.g., button) 511, or may decide to use the actual address by selecting object (e.g., button) 513. Optionally, the user may be provided with a warning, pop-up window, or other report indicating a risk associated with the recipient of the email to be sent via the web form user interface 500 (e.g., Taco Town). Accordingly, a user engaging in online shopping via browser may use the proxy address at the time of ordering by use of a web form such as the one shown in FIG. 5, and as discussed above.

The foregoing example implementations of FIGS. 3-5 are directed to the generation of the attributes. As explained above, the attributes are provided to the server 207, which calculates a risk value based on the attributes as well as optionally calculating a server-generated risk score. Once the determination has been made to use a proxy address, the proxy address is created for the electronic communication. As explained above, the proxy address may be newly created, or may be a persistent proxy address. To manage proxy addresses, the database 209 may include, for example a table.

Further, the user may determine the recipients or types of recipients to be treated by use of the unique proxy addresses. For example, but not by way of limitation, the user may flag recipients based on email or account address, domain, or other identifying information. Classes of recipients (e.g., commercial organizations, government, private email, university, or other) may also be the basis for determining whether to use a proxy address. Recipients having no previous communication history with the user, or recipients that have been determined to be untrusted or not considered trusted as of yet may also be tagged by the user for proxy address communication. Further, the manner of contact, such as via email, web form, mobile, third party application, or other manner, may be a basis for automatic tagging for proxy address communication. Other information, such as reputation score (e.g., external party evaluation) may also form the basis of an automated tagging for proxy address communication.

FIG. 6 shows a table configured to store information associated with a source and a destination, according to an example implementation. For example, in the first row, the email address foo@test.com is the email address being used by the server, and is also the original email address. Thus, the status is "original", and the target entity (e.g., domain) receives the email at test@xcom.com that includes the actual address of the user.

As shown in the second row, the email address foo+XCOM@test.com is an active proxy address provided to the XCOM domain, and specifically, to test@xcom.com. In the third row, the proxy address foo54376@test.com is the proxy address, and based on risk determination (e.g., activity of the user, or aggregated report generated by the server), all email addressed to this proxy address is blacklisted. For example, the proxy address may have been provided by test@xcom.com to a third party which has sent viruses or spam to users, and thus, all emails received bearing this proxy address are blacklisted.

As shown in the fourth row, dfghsfegd@test.com is a proxy address that appears obfuscated, to make it more difficult for the target entity XCOM to determine the source. The proxy address remains active for the target email test@xcom.com.

With respect to the fifth through eighth rows in the table of FIG. 6, similar results are shown for another original email address and target. The foregoing description also applies to these rows. Additionally, the wild card "*" is used in *@xbank.com, indicating that one or more email addresses that include any account name prior to "@xbank.com will be associated with the proxy address.

Further, the table is not limited to eight rows, or any specific number of rows, and may contain the information of any number of source-destination combinations, and may include further columns containing additional information (e.g., message content, reason for blacklist, number of spam or virus reports, etc.), as would be understood by those skilled in the art.

Figure 7:
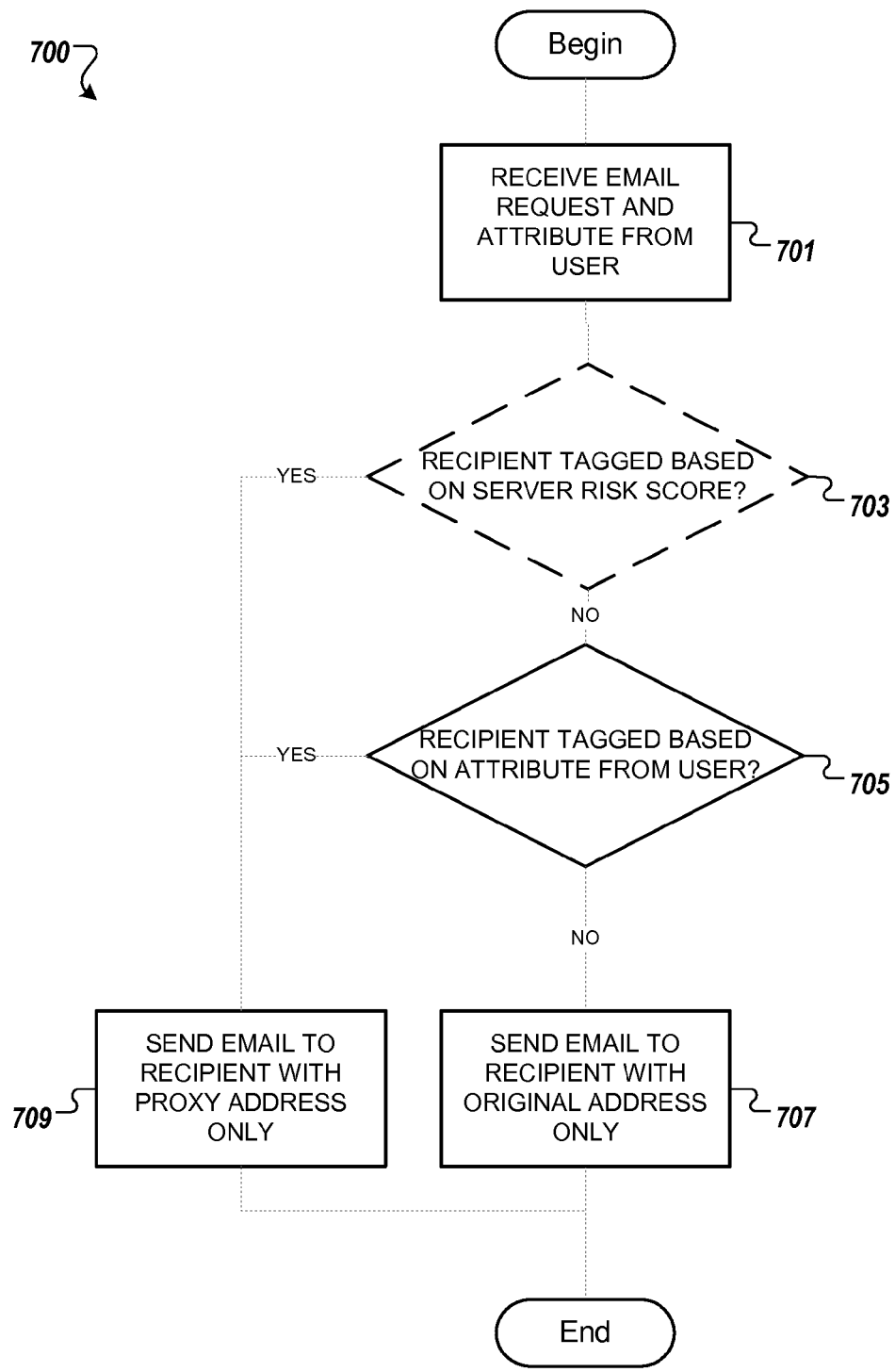
FIG. 7 shows an example of a process implementation associated with a transmission from a source to a destination, according to an example implementation.
Figure 8:
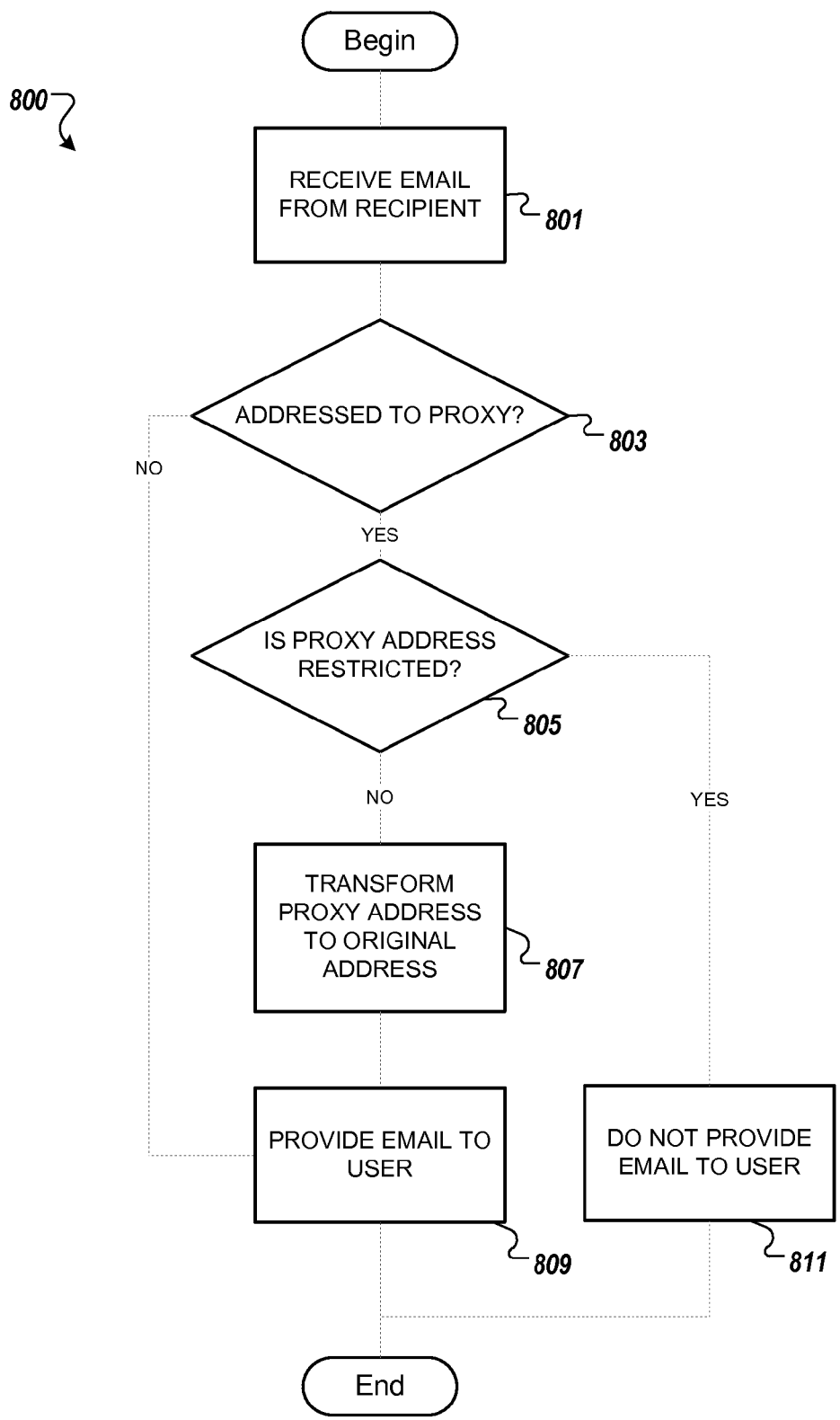
FIG. 8 shows an example of a process implementation associated with return transmission from a destination to a source, according to an example implementation.

FIGS. 7 and 8 show examples of process implementations associated with the foregoing disclosure.

FIG. 7 illustrates a process 700 for generating an electronic communication, and providing the electronic communication from the source (e.g., party A) to the destination (e.g., party B). At 701, a request is received at the server to transmit an electronic communication, along with an attribute from the user. The request may be generated by a user, for example, as shown in FIG. 3, and the attribute may be provided at the time of creation of the electronic communication (e.g., FIG. 3), or prior to creation (e.g., via account settings of FIG. 4); thus, the attribute may be sent automatically, without the user having to take any action. Alternatively, the user interface of FIG. 5 (e.g., web form) may be employed, or any other interface may be substituted therefor as understood by those skilled in the art.

At 703, optionally, a determination is made as to whether the recipient is tagged (e.g., represents a risk for the use to expose his or her actual email identity due to spam, virus, etc.), based on the server risk score. For example, but not by way of limitation, the server risk score may be calculated based on an aggregation of responses to proxy addresses across multiple users, a spam or virus report associated with the recipient, or other metric for determining risk. If the risk exceeds a threshold (e.g., based on number or percentage of spam originating from the recipient, user complaints, or other metric), the recipient is indicated as tagged at 703.

If the recipient is not tagged at 703 based on the server risk score, at 705 a determination is made as to whether the recipient is tagged based on the attribute transmitted by the user. For example, the attribute of 705 may be a user instruction provided in the email interface of FIG. 3 or the web form of FIG. 5 at the time of creation of the electronic communication, or based on account settings or a user profile as shown in FIG. 5. If the attribute indicates that the proxy address should be used, the recipient is considered tagged at 705.

While 703 and 705 are shown in sequence in FIG. 7, the processes may be performed in the same order or reverse order, in sequence. Alternatively, the processes may be performed in parallel (e.g., substantially simultaneously). Further, 703 is optional, and the example implementation may proceed by only performing process 705 and not performing process 703.

For the determination that the recipient is tagged at 703 and/or 705, the electronic communication is provided to the recipient with only a proxy address, and not the actual address, at 709. Also at 709, the proxy address is selected. As noted above, the proxy address may be used on a one-time basis or persistent, depending on the preference of the user.

For example, the user may choose to continue to use the same proxy address as discussed above with respect to FIG. 4, or change the proxy address, or generate a new proxy address at each instance of creating an electronic communication. Thus, the proxy address may be generated, as described above (e.g., random string and table, or cryptography and public key and private key).

Alternatively, if there is no indication of risk by the server at 703 or attribute from the user at 705, the electronic communication is provided to the client at 707 with the original email, and not with any proxy address. Accordingly, this communication may also be recorded in the table of FIG. 6 (e.g., first row), indicating a status of "original".

According to the example process of FIG. 7, a proxy address may be used for electronic communication as shown in FIG. 2, based on user information (e.g., via user interfaces of FIGS. 3-5) and server risk determination. Thus, the recipient may receive an email from a proxy address without knowing the actual identity of the email address. Further, because the proxy address may be an email address for which the original address cannot be derived (e.g., use of random string, cryptography, or the like as noted above), the recipient cannot determine the identity of the sender.

On the other hand, if the recipient provides the proxy address to another party and spam or virus communication is subsequently sent to the proxy address, the server can use the table of FIG. 6 to associate the proxy address with the original address, or a private key maintained to decrypt the proxy address and thus obtain the original address. Because the proxy address is associated with a specific recipient, the server can associate the spam, virus or other activity (e.g., risky activity) sent by other parties with the party that originally provided or sold the proxy address.

FIG. 8 illustrates an example process 800 of receiving an email containing the proxy address. In 801, the server receives an email addressed to a recipient (e.g., another request, as compared with the request of the user as discussed above with respect to FIG. 7). At 803, the server determines whether the email address is a proxy address or an original address. This determination may be performed, for example, by use of a table such as in FIG. 6, or a private key decryption. If the email address is not a proxy address, the process passes to 809, and the email is provided to the user, because the email address is original, and not a proxy address.

On the other hand, if it is determined at 803 that the email address is a proxy address, at 805 it is determined whether the proxy address is restricted. For example but not by way of limitation, the server may check in a blacklist, filter, risk report, or other information, to determine whether the proxy address is restricted.

If it is determined at 805 that the proxy address is restricted, then at 811, the action taken by the server is to not provide the email to the user (e.g., a first action). The email may be included in an aggregate report on the risk of the recipient, simply deleted without further action, or stored for further analysis. Alternatively, the user may be informed that a restricted email has been received, and may be given the option of accessing that email in the form of a report (e.g., periodic) containing such information.

If it is determined at 805 that the proxy address is not restricted, then at 807, the proxy address is transformed into the original address (e.g., a second action). As explained above, this transformation may be conducted by way of lookup table, cryptology, or other manner as would be understood by those skilled in the art. Once the transformation of 807 has been completed, the email is sent to the user at 809.

In some examples, processes 700 or 800 may be implemented with different, fewer, or more blocks. Processes 700 or 800 may be implemented as computer executable instructions, which can be stored on a medium, loaded onto one or more processors of one or more computing devices, and executed as a computer-implemented method.

Figure 9:
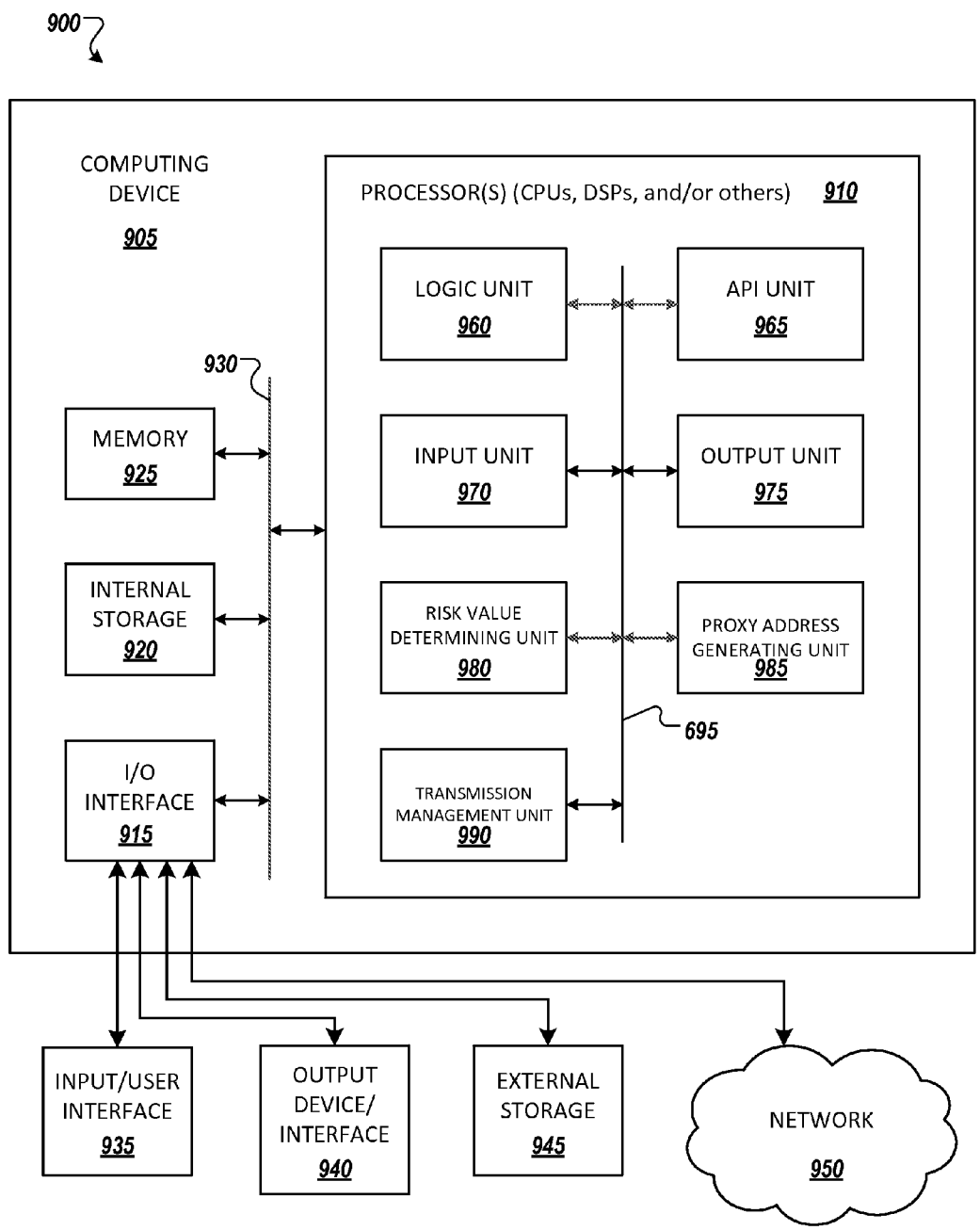
FIG. 9 shows an example computing environment with an example computing device suitable for use in some example implementations.

FIG. 9 shows an example computing environment with an example computing device suitable for use in some example implementations. Computing device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computing device 905.

Computing device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computing device 905. In other example implementations, other computing devices may function as or provide the functions of input/user interface 935 and output device/interface 940 for a computing device 905.

Examples of computing device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 905 can be communicatively coupled (e.g., via I/O interface 925) to external storage 945 and network 950 for communicating with any number of networked components, devices, and systems, including one or more computing devices of the same or different configuration. Computing device 905 or any connected computing device can be functioning as, providing services of, or referred to as a server, client, thin server, general machine, special-purpose machine, or another label.

The I/O interface 925 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computing device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, risk value determining unit 980, proxy address generating unit 985, transmission management unit 990, and inter-unit communication mechanism 995 for the different units to communicate with each other, with the OS, and with other applications (not shown). For example, risk value determining unit 980, proxy address generating unit 985, and transmission management unit 990 may implement one or more processes shown in FIGS. 7 and 8. The described units and elements can be varied in design, function, configuration, or implementation and are not limited to the descriptions provided.

In some example implementations, when information or an execution instruction is received by API unit 965, it may be communicated to one or more other units (e.g., logic unit 960, input unit 970, output unit 975, risk value determining unit 980, proxy address generating unit 985, and transmission management unit 990). For example, risk value determining unit 980 may make a determination of the risk of a recipient based on aggregated information across users, individual user feedback or reports, or other statistical data. Based on the risk value, the risk value determining unit 980 may request the proxy address generating unit 985 to either create a new proxy address or select a persistent proxy address, as explained above.

Further, the transmission management unit 990 may manage communication between the source and the destination (e.g., recipient). The foregoing may occur after input unit 970 has detected a user indication or feedback, input unit 970 may use API unit 965 to communicate the user indication to risk value determining unit 980. Risk value determining unit 980 may, via API unit 965, interact with the proxy address generating unit 985 to detect and process a comment. Using API unit 965, risk value determining unit 980 may interact with transmission management unit 990 to determine whether to propagate the feedback and/or identify information to an upstream post.

In some instances, logic unit 960 may be configured to control the information flow among the units and direct the services provided by API unit 965, input unit 970, output unit 975, risk value determining unit 980, proxy address generating unit 985, and transmission management unit 990 in some example implementations described above. For example, the flow of one or more processes or implementations may be controlled by logic unit 960 alone or in conjunction with API unit 965.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
receiving, at a server, a request to provide data from a first address to a second address, the request including an attribute associated with the second address;
determining a risk value of the second address, based on the attribute associated with the second address;
based on the risk value of the second address, generating a third address that is associated with the first address; and
providing, by the server, the data and the third address to the second address, without providing the first address to the second address.

2. The computer-implemented method of claim 1, the generating the third address comprising:
transforming the first address by at least one of (a) inserting one or more additional characters in a string of the first address, (b) appending the first address with a unique string, and (c) deriving an obfuscated address as the third address, which cannot be converted to the first address without authorization,
wherein the third address is a unique proxy address for the second address.

3. The computer-implemented method of claim 2, wherein the deriving the obfuscated address comprises at least one of (a) generating a random string as the third address, and associating the third address with the first address in a mapping table, and (b) performing a cryptographic operation on the first address to generate the third address by a public key, and maintaining a private key configured to associate the third address with the first address.

4. The computer-implemented method of claim 1, wherein the attribute is generated by a user of the first address based on a prompt to the user during generation of the request.

5. The computer-implemented method of claim 1, wherein the determining comprises determining a risk value of the second address, based on the attribute associated with the second address and a risk score generated by the server.

6. The computer-implemented method of claim 1, wherein the attribute is generated by a user of the first address based on an online account profile associated with the first address, before a generation of the request.

7. The computer-implemented method of claim 1, further comprising:
receiving, at the server, another request, to provide data from the second address to the first address or the third address;
for the another request to provide data from the second address to the first address, providing, by the server, the data from the second address to the first address;
for the another request to provide data from the second address to the third address, if the second address is a restricted address, taking a first action, and if the second address is not a restricted address, taking a second action.

8. The computer-implemented method of claim 7, wherein the first action comprises not providing the data to the first address, and the second action comprises transforming the third address into the first address, and providing the data to the first address with an indication of the transforming.

9. The computer-implemented method of claim 1, further comprising generating a risk profile of the second address based on the risk value associated with the request and another risk value associated with another request to provide the data to the second address.

10. A non-transitory computer readable medium having stored therein computer executable instructions for:
receiving a request to provide data from a first address to a second address, the request including an attribute associated with the second address;
determining a risk value of the second address, based on the attribute associated with the second address;
based on the risk value of the second address, generating a third address that is associated with the first address; and
providing the data and the third address to the second address, without providing the first address to the second address.

11. The non-transitory computer readable medium of claim 10, the generating the third address comprising:
transforming the first address by at least one of (a) inserting one or more additional characters in a string of the first address, (b) appending the first address with a unique string, and (c) deriving an obfuscated address as the third address, which cannot be converted to the first address without authorization,
wherein the third address is a unique proxy address for the second address.

12. The non-transitory computer readable medium of claim 11, wherein the deriving the obfuscated address comprises at least one of (a) generating a random string as the third address, and associating the third address with the first address in a mapping table, and (b) performing a cryptographic operation on the first address to generate the third address by a public key, and maintaining a private key configured to associate the third address with the first address.

13. The non-transitory computer readable medium of claim 10, wherein the attribute is generated by a user of the first address based on a prompt to the user during generation of the request.

14. The non-transitory computer readable medium of claim 10, wherein the determining comprises determining a risk value of the second address, based on the attribute associated with the second address and a risk score.

15. The non-transitory computer readable medium of claim 10, wherein the attribute is generated by a user of the first address based on an online account profile associated with the first address, before a generation of the request.

16. The non-transitory computer readable medium of claim 10, further comprising:
receiving another request, to provide data from the second address to the first address or the third address;
for the another request to provide data from the second address to the first address, providing the data from the second address to the first address;
for the another request to provide data from the second address to the third address, if the second address is a restricted address, taking a first action, and if the second address is not a restricted address, taking a second action.

17. The non-transitory computer readable medium of claim 16, wherein the first action comprises not providing the data to the first address, and the second action comprises transforming the third address into the first address, and providing the data to the first address with an indication of the transforming.

18. The non-transitory computer readable medium of claim 10, further comprising generating a risk profile of the second address based on the risk value associated with the request and another risk value associated with another request to provide the data to the second address.

19. At least one computing device comprising storage and a processor configured to perform:
receiving a request to provide data from a first address to a second address, the request including an attribute associated with the second address;
determining a risk value of the second address, based on the attribute associated with the second address;
based on the risk value of the second address, generating a third address that is associated with the first address; and
providing the data and the third address to the second address, without providing the first address to the second address.

20. The at least one computing device of claim 19, wherein the attribute is generated by a user of the first address based on a prompt to the user during generation of the request, and the determining comprises determining a risk value of the second address, based on the attribute associated with the second address and a risk score.

* * * * *